United States Patent [19]

Wagner

[11] Patent Number: 5,121,152

[45] Date of Patent: Jun. 9, 1992

[54] AUTOFOCUS SYSTEM FOR CAMERAS

[76] Inventor: Gert Wagner, Mühlenkamp 31, D-2000 Hamburg 60, Fed. Rep. of Germany

[21] Appl. No.: 535,677

[22] Filed: Jun. 11, 1990

[30] Foreign Application Priority Data

Jun. 14, 1989 [DE] Fed. Rep. of Germany ....... 3919480
Aug. 29, 1989 [DE] Fed. Rep. of Germany ....... 3928549

[51] Int. Cl.$^5$ ............................................. G03B 13/00
[52] U.S. Cl. ................................. 384/402; 358/227
[58] Field of Search ................. 358/227; 354/400-409

[56] References Cited

U.S. PATENT DOCUMENTS

| | | | |
|---|---|---|---|
| 4,075,640 | 2/1978 | Ueda et al. | 354/476 |
| 4,341,451 | 7/1982 | Krueger et al. | 354/289 |
| 4,475,800 | 10/1984 | Kinoshita et al. | 354/406 |
| 4,483,602 | 11/1984 | Aoki et al. | 354/406 |
| 4,573,784 | 3/1986 | Suzuki | 354/406 |
| 4,614,975 | 7/1986 | Kaite | 358/227 |
| 4,835,562 | 5/1989 | Norita et al. | 354/408 |
| 4,872,058 | 10/1989 | Baba et al. | 358/402 |

FOREIGN PATENT DOCUMENTS

| | | |
|---|---|---|
| 2514230 | 10/1975 | Fed. Rep. of Germany . |
| 206250 | 8/1982 | Fed. Rep. of Germany . |
| 3324985A1 | 8/1982 | Fed. Rep. of Germany . |
| 3211234A1 | 10/1982 | Fed. Rep. of Germany . |
| 3211234A1 | 10/1982 | Fed. Rep. of Germany . |
| 3506492A1 | 8/1986 | Fed. Rep. of Germany . |
| 3830794A1 | 4/1989 | Fed. Rep. of Germany . |

OTHER PUBLICATIONS

Japanese Publication B2-55-39809, dated Oct. 14, 1980.
Japanese Publication 50-129221, dated Oct. 13, 1975.
Japanese Publication 52-40133, Mar. 28, 1977.
Japanese Publication A-61-249034, dated Nov. 6, 1986.
Japanese Publication Y2-54-19870, dated Jul. 20, 1979.
Japanese Publication A-57-161708, dated Oct. 5, 1982.
Japanese Publication A-59-107685, dated Jun. 21, 1984.
"Yashica 230-AF Auto-Focus SLR", Modern Photography, pp. 46-53, Apr. 1987.
"Yashica 230-AF", Popular Photography, Jun. 1987.

*Primary Examiner*—L. T. Hix
*Assistant Examiner*—David M. Gray
*Attorney, Agent, or Firm*—Armstrong, Nikaido, Marmelstein, Kubovcik, and Murray

[57] ABSTRACT

The present invention relates to an autofocus system for cameras with a separator (4) to split the object (2) in an autofocus measuring field (3) viewed through the camera lens (1) into two beams to determine the distance of the object (2) from the film plane (30). A control system which sets the focus of the camera lens (1) in accordance with the measured distance by means of servomotors or similar is provided to control the focusing of the camera lens (1). The invention provides for the autofocus measuring field (3) to be displaced such that it occupies any desired location within the frame (14).

13 Claims, 4 Drawing Sheets

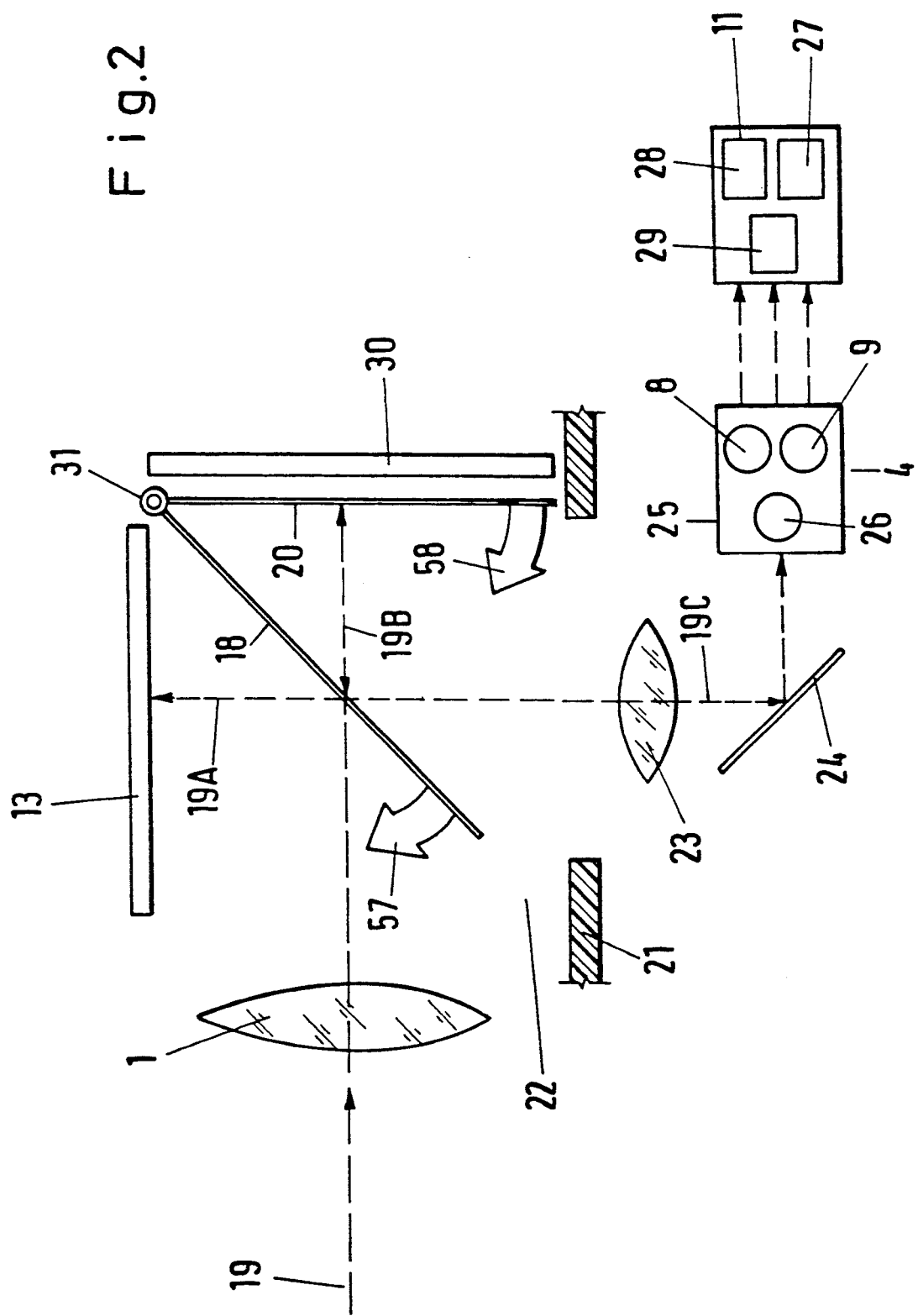

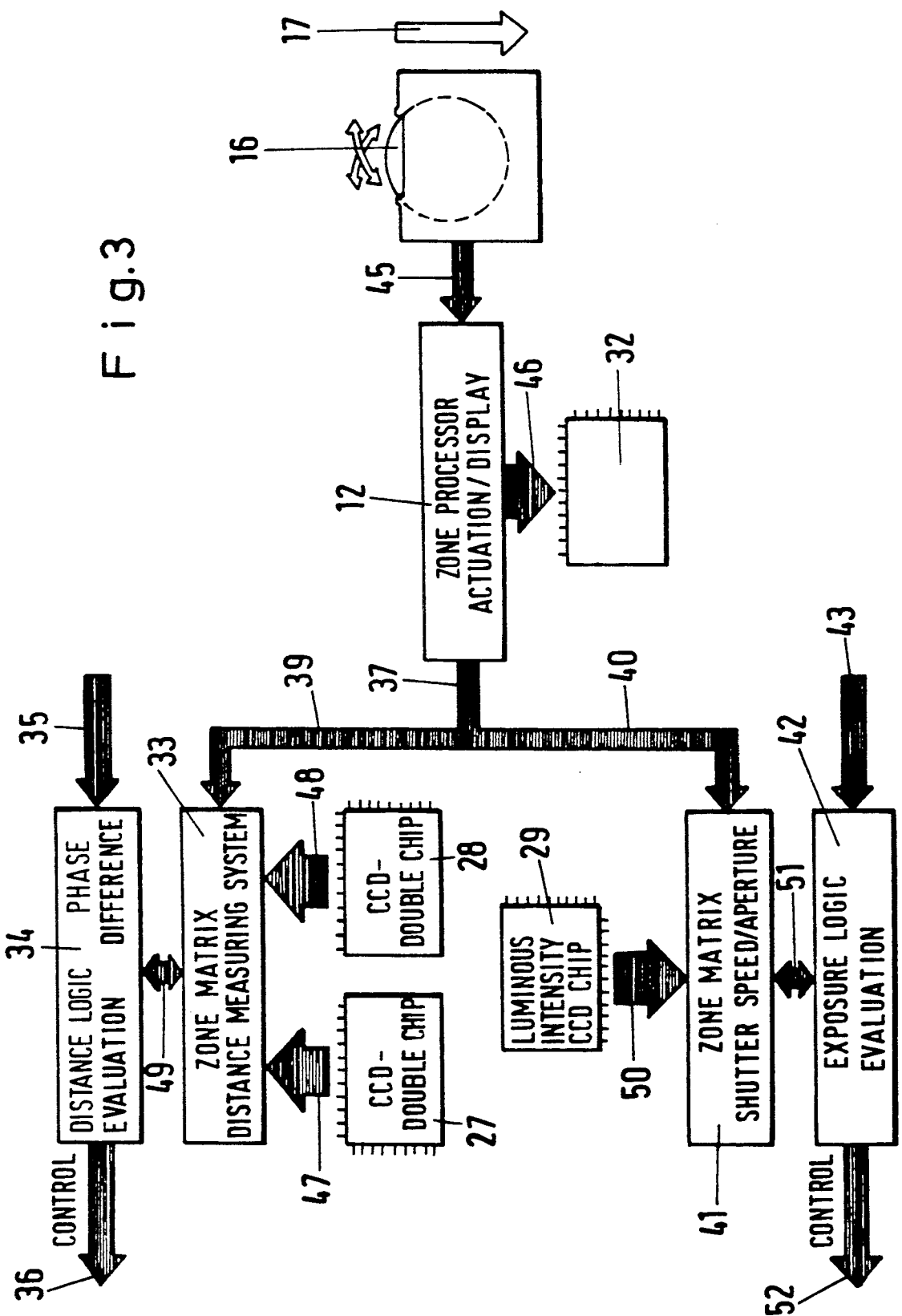

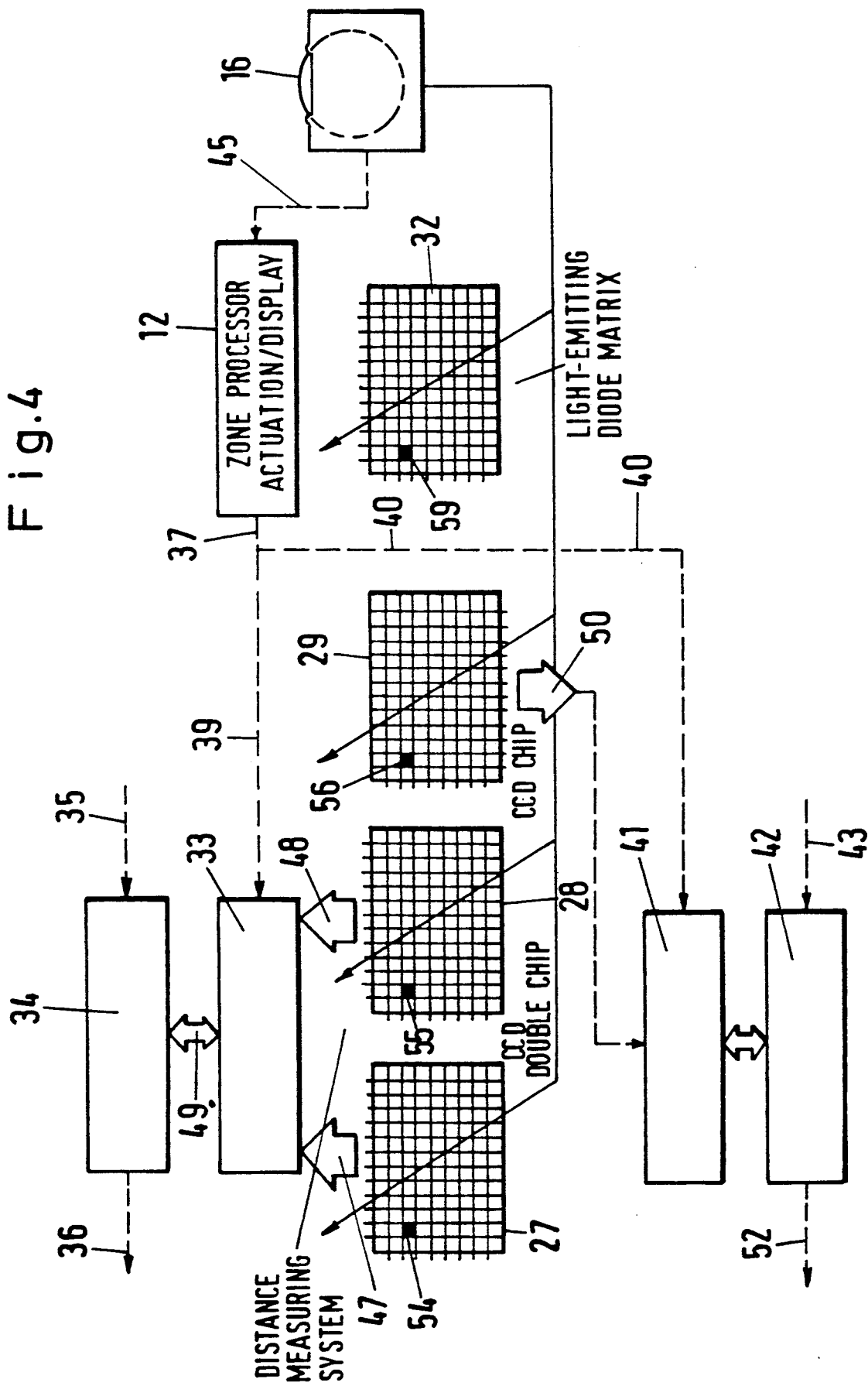

AUTOFOCUS SYSTEM FOR CAMERAS

BACKGROUND OF THE INVENTION

The present invention relates to an autofocus system for cameras with a separator to divide the object in an autofocus measuring field viewed through the camera lens into two beams to determine the distance of the object from the film plane and with a control system to control the focusing of the camera lens which sets the focus of the camera lens in accordance with the measured distance by means of servomotors or similar.

Such autofocus systems are generally known in the art. All autofocus systems used to date comprise an autofocus measuring field which is comparatively small and lies in the centre of the image. Consequently, the object on which the camera is to focus must also be located exactly in the centre of the image. In some technically more sophisticated cameras this disadvantage is overcome in that the set focus can be stored in a memory, although with some systems this is only possible for the duration of a single frame. Only if this supplementary memory is used is it possible for the object also to be positioned outside the centre of the image and for the shutter then to be released. This solution is only practicable, however, if the object does not move, i.e. it remains within the focus range once this has been determined. Otherwise, the whole focusing process must be repeated which is completely impossible, for example, with constantly moving objects. It has thus been shown in practive that both precise light metering and reliable focusing by means of the autofocus system can only be achieved in an uncomplicated fashion on condition that the object to be photographed exhibits little movement and is located exactly in the centre of the frame. Freer picture composition is only possible by means of storing the readings, although this compromise is not possible with moving objects, as a result of which all the advantages of automatic light metering and focusing are nullified.

SUMMARY OF THE INVENTION

With this as a background it is the object of the present invention to improve upon an autofocus system of the kind mentioned in the introduction such that the efficiency of the autofocus system can be used in every situation, irrespective of where in the frame the object on which the camera is to focus is located.

This object is achieved in the invention in that the autofocus measuring field can be displaced such that it occupies any desired location within the frame.

It is apparent that this provides the photographer with every opportunity for individual picture composition while fully exploiting all the advantages of the autofocus system since on the basis of the proposed solution the measuring field for the autofocus system can be set at will to cover the object which is to be photographed or the most important object within an image.

In a particularly preferred embodiment of the invention the metering point of the camera's spot meter can be displaced together with the autofocus measuring field. This enables the main subject always to be sharp and correctly exposed in every situation regardless of the picture composition chosen by the photographer.

Autofocus systems used to date, whether utilising infra-red measurements or the two-element lens system, are always based on a small field exactly in the centre of the image. The flexible autofocus system according to the invention provides the opportunity to position the autofocus measuring zone and, if required, also the spot metering zone at any desired location within the whole frame. There are two fundamental solutions to implement this principle in practive, namely a mechanical and an electronic solution.

In detail, therefore, the invention can be improved in that the displacement of the autofocus measuring field occurs mechanically.

Thus in a particularly preferred embodiment of the invention the measuring unit which receives the double image from the separator and, if required, contains the metering point of the spot meter can be displaced along two main axes which are located perpendicular relative to each other.

Alternatively the measuring unit can be formed such that it can pivot on its axis. In both cases the measuring unit is located in the exact position within the frame where the point of focus and also the correct exposure are desired. Consequently the entire compact block of the autofocus and spot metering systems is mechanically moved within the frame and then locked in the location which is to be measured.

Movement can occur either mechanically by means of knurled wheels or similar with a suitable transport system or electromechanically with the aid of rocker switches and electric motors.

A particularly preferred embodiment of the invention provides specifically for the mechanical transport system to be connected to an indicator dot on the focusing screen of reflex cameras or in the viewfinder of viewfinder cameras which indicates the location of the autofocus measuring field within the frame. Such an indicator dot which is preferably designed to be optically striking and as multi-coloured as possible indicates absolutely clearly to the photographer where measurements are being made within the frame.

It is further preferred that the whole frame be optically reduced before the measuring unit, as close as possible before the measuring cells such that the movements required to position the measuring block are greatly reduced within a very restricted area.

In an alternative, particularly preferred principle for solving the practical implementation of the fundamental idea underlying the invention the displacement of the autofocus measuring field occurs electronically.

The electronic solution also utilises the available measuring process in which the image is split or duplicated by means of two lenses. However, in this instance it is preferred that the whole frame rather than the partial image from the autofocus measuring field be duplicated in the separator. A microprocessor is provided which measures a specifiable partial area within the complete image. In this regard, the microprocessor measures that partial area which is to be measured depending on the location of the main subject.

In a particularly preferred embodiment of the invention the duplicated complete images from the separator are transmitted to a CCD double chip and the partial areas are actuated synchronously by the microprocessor on the CCD chips of the double chip.

In particular it is further preferred in this regard that the complete image be transmitted to a luminous intensity CCD chip and that it be possible for a partial area of the luminous intensity CCD chip to be specified by the microprocessor.

It is particularly advantageous in this regard that the actuation of the partial area of the luminous intensity CCD chip occur synchronously with the actuation of the partial areas of the CCD double chip. This form of embodiment ensures that the spot metering occurs in the zone which has been specified for the point of focus since this is usually the main constituent of the subject. It is self-evident that other embodiments are possible in which the partial area specified to correspond to the metering point of the spot meter consciously diverges from the zone specified for the point of focus if this is regarded as advantageous for the purposes of picture composition. To this end it is a simple matter to provide for the displacement of the metering point of the spot meter to be disconnected from the displacement of the autofocus measuring zone.

In a particularly preferred embodiment of the invention a plurality of adjacent partial areas can be specified by the microprocessor to alter the size and form of the autofocus measuring field and, if required, the metering point of the spot meter. This not only enables the simple change in the size of the measuring field described further below to be carried out but also permits the measuring field to be matched for example to the particular shape of the photographic subject such that with tall narrow objects a narrow upright rectangle can be specified and with low wide objects a low, prone rectangle in order to guarantee both correct light metering and focusing over the entire subject.

It is also preferred with this embodiment that the frame be optically reduced in order to achieve compactness of design.

It is further preferred in particular that light-emitting diodes or a laser system be provided which indicate on the focusing screen which zone of the image is being measured. This permits an optical check to be provided in the viewfinder of which partial area is being measured by the microprocessor.

A zone selector which can be in the form of, for example, a track ball or a joystick is provided to operate the microprocessor.

In a particularly preferred embodiment of the invention the camera's shutter release is combined with the zone selector such that focusing, light metering and release of the shutter are possible with one finger and one movement.

In an advantageous improvement to the invention the autofocus measuring field together with the metering point of the spot meter are reset to the image centre when the camera is switched on and/or when the zone selector is released.

A particularly preferred embodiment of the invention provides for the size of the autofocus measuring field to be variable. A small measuring zone can result in significant errors, particularly in the close-up range of a telephoto lens. With portrait photography, for example, a measuring area which is enlarged for this purpose would prevent perhaps the tip of the nose being sharp while the eyes are already out of focus. Furthermore, an enlarged measuring field would make it easier and less risky to follow a moving object.

The invention is described below with reference to the embodiments exemplified in the form of illustrations in the drawings in which:

BRIEF DESCRIPTION OF THE PREFERRED EMBODIMENT

FIG. 2 shows a schematic illustration of the path through the camera of the light beams representing a complete image;

FIG. 3 is a schematic chart showing connections for the autofocus system according to FIG. 1; and FIG. 4 is a drawing corresponding to FIG. 3 which describes the displacement and selection of the measuring field in greater detail.

Figure 1:
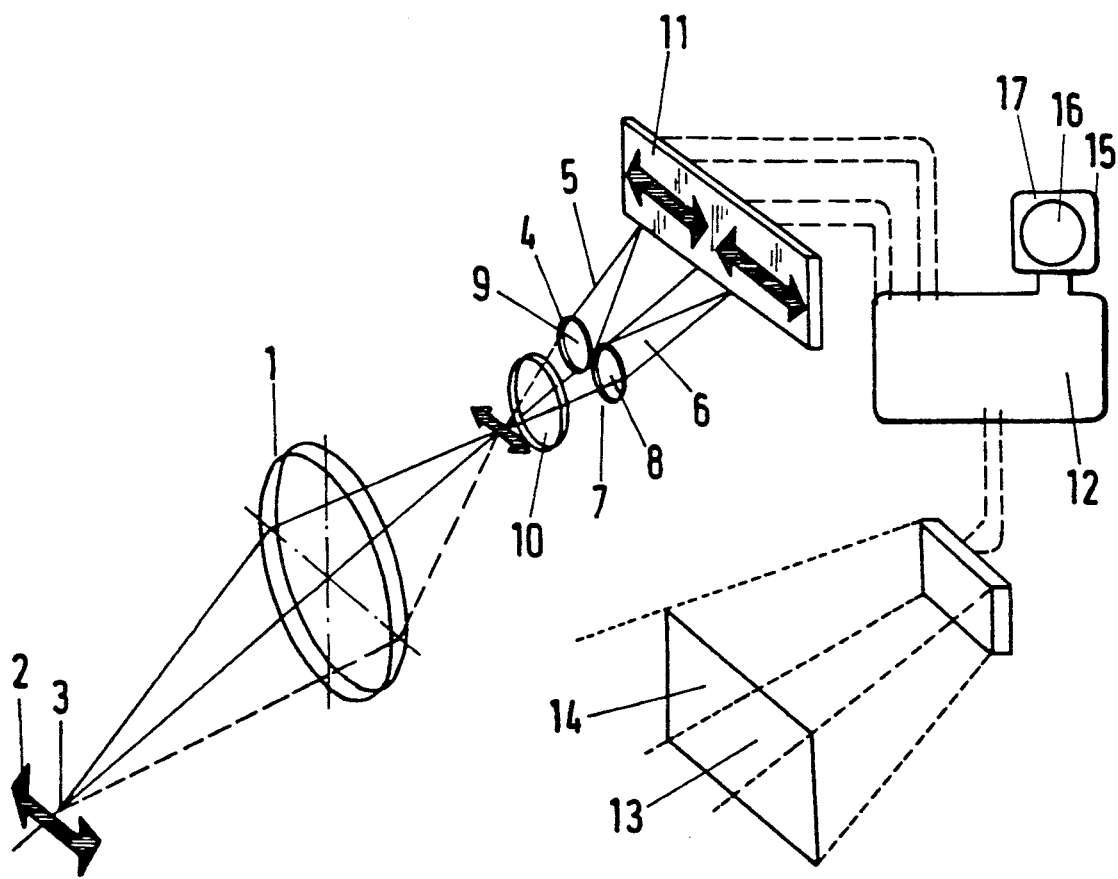
FIG. 1 shows a schematic illustration of an embodiment of the invention in which the displacement of the autofocus measuring field within the frame occurs electronically.

For the distance measuring system in the embodiment illustrated in FIG. 1 a two-element lens system 7 is shown which splits the object 2 viewed through the camera lens 1 in an autofocus measuring field 3 into two beams 5 and 6 where in FIG. 1 said two-element lens system forms a separator 4. It should be noted here that the fundamental principles of the present invention also apply to systems in which distance is measured according to the infra-red principle.

In the embodiment illustrated in FIG. 1 the image is duplicated by means of the two lenses 8 and 9 shown, although by contrast with the prior art it is not a partial image but the complete frame which is utilised. The entire frame is optically reduced for the purposes of saving space by means of an interposed lens system 10. The distance between the object 2 and the film plane which is not shown in FIG. 1 is derived from the interaction of the separator 4 and the double-image CCD 11, where a microprocessor 12 specifies a partial area from within the complete image in which the reading is taken. The partial area specified is effectively that which the photographer wishes to measure. At the same time light-emitting diodes or a laser system indicate on the camera's focusing screen 13 which area of the image is being measured, where the outline of said focusing screen symbolises the whole frame 14. The microprocessor 12 is designated AF selective processor in the embodiment illustrated in FIG. 1.

The microprocessor 12 is operated by means of a zone selector 15 which can be, for example, in the form of a track ball 16 or a joystick. As indicated by means of the circle drawn in the zone selector 15, it is preferred that the shutter release 17 be integrated in the function of this part such that focusing, light metering and release of the shutter are possible with one finger and one movement.

The schematic drawing shown in FIG. 2 illustrates the path of the light rays representing the chosen photograph through the camera.

As illustrated, the camera comprises a first hinged mirror 18 in the form of a semi-transparent mirror. The beam of light 19 passes through the camera lens 1 and strickes the hinged mirror 18 where part 19A of the light 19 is directed onto the focusing screen 13 of the pentaprism and forms the image there of the chosen photograph. Because of the semi-transparent nature of the hinged mirror 18 a second part 19B of the light 19 is directed onto the fully-reflecting mirror 20 behind this from where it is reflected onto the rear of the hinged mirror 18 which is silvered on both faces. The light beam 19B is then reflected by the rear of the hinged mirror 18 downwards into the camera body 21 below the image path 22.

A reduction lens 23 by which the entire frame is reduced is provided below the image path, and the reduced image represented by the light beam 19C is diverted by a further mirror 24 and routed to a three-element lens system 25.

The three-element lens system 25 contains the above-mentioned double lens 8, 9 which forms the separator 4 and a single lens 26 assigned to the light metering system.

The double lens system 28, 29 of the separator 4 in the three-element lens system 25 projects two separate entire images to a CCD double chip which contains two separate CCD chips 27 and 28 and is assigned to the autofocus measuring system, where the CCD chips 27, 28 form the double-image CCD mentioned with reference to FIG. 1.

The entire image is transferred simultaneously to a luminous intensity CCD chip 29 by the single lens 26 assigned to the light metering system.

For the sake of completeness it should be noted that the hinged mirror 18 and the fully reflecting mirror 20 are swivel-mounted in a common hinge 31 and that if the shutter is released both pivot briefly upwards towards the focusing screen 13 in order to give access to the film plane 30 as indicated by the arrows 57 and 58 in FIG. 2. After the shutter release action has been completed the mirrors 18 and 20 return to their position as illustrated in FIG. 2, although this process generally occurs so rapidly that it is scarcely perceptible through the camera's viewfinder.

In summary, it is emphasised that the luminous intensity CCD chip 29 and the CCD chips 27, 28 of the CCD double chip each receive the whole frame.

The displacement of the autofocus measuring field and the metering point of the spot meter are now described below with reference to FIGS. 3 and 4.

As shown in FIG. 3, the track ball 16 connected to the shutter release 17 is configured such that the rotary and rolling motions carried out with the track ball 16 are converted into pulses which are fed as a signal 45 to the microprocessor 12 which is designated as a zone processor. By means of this signal partial areas are activated simultaneously on all three CCD chips 27, 28 and 29 and additionally on a light-emitting diode matrix 32 in the camera viewfinder, where said partial areas correspond in location and size to the area to be measured and are displayed in this way simultaneously in the viewfinder.

As shown in FIG. 3, a signal 46 serves to activate the light-emitting diode matrix 32 appropriately. The signal leaving the microprocessor 12 as an output signal 37 is split into two separate signals 39 and 40, of which signal 39 is directed to the zone matrix 33 of the distance measuring system. Via the zone matrix 33 the partial areas specified on the CCD double chip via the track ball 16 are evaluated by means of the signals 47 and 48 and directed by a signal 49 to the distance logic evaluation system 34 to which additional information such as measuring field data and similar variables is fed from the camera's CPU in a signal 35. The signal 49 contains the readings of the distance measuring system with reference to the area specified on the CCD double chip 27, 28 so that the signal 36 which ultimately serves to control the distance setting relates to the specified autofocus measuring field.

The signal directed from the microprocessor 12 to the zone matrix 41 of the light metering system is processed together with the signal 50 from the luminous intensity CCD chip where said signal 50 relates to the measuring field specified on the luminous intensity CCD chip.

The processing which occurs in the zone matrix 41 of the light meter to determine the shutter speed or aperture results in a signal 51 which is transmitted to the exposure logic 42. The exposure logic also receives a signal 43 with information from the camera CPU containing various metering methods such as spot, integral metering etc., as a result of which the ultimate control signal 52 for setting the shutter speed and aperture together with the other variables relates exclusively to the zone specified on the luminous intensity CCD chip.

The further embodiment in FIG. 4 of the chart according to FIG. 3 shows again the actuation of the various CCD chips together with the light-emitting diode matrix 32.

As shown, in addition to the signal 45 to the microprocessor 12, each of the CCD chips is actuated by the track ball 16 such that a measuring field is specified with reference to its location and size simultaneously and synchronously on the CCD chips 27, 28 of the double-image CCD 11 and on the CCD chip 29 of the spot meter, where said measuring field is represented by the partial areas 54, 55 and 56. At the same time a partial areas 59 whose location and size correspond to the partial areas 54, 55 and 56 is also displayed with simultaneous and synchronous actuation in a corresponding position on the light-emitting diode matrix 32.

By means of appropriate supplementary signals via the track ball 16 purely for displacing the partial areas within the CCD chips representing the complete image or the light-emitting diode matrix 32, appropriate supplementary partial areas adjacent to the partial areas 54, 55, 56 and 59 can be activated in order to change the size and also the shape of the autofocus measuring field 3 and the metering point of the spot meter with an appropriate display on the light-emitting diode matrix 32. For example, in addition to the location displacement process, three or four partial areas with superposed locations on the CCD chips 27, 28 and 29 can be activated to permit correct measurements to be performed with objects to be photographed which are narrow and tall. With wide, low object appropriate adjacent partial areas can be activated. Appropriately shaped geometric figures can be composed out of the partial areas by means of additional control pulses in order simply to enlarge or reduce the relevant measuring fields.

Under all circumstances the signals 47, 48 and 50 emanating from the CCD chips 27, 28 and 29 for further control purposes correspond to the relevant zone specified within the complete image.

For details of further individual components as shown in FIG. 4 please refer to the description relating to FIG. 3.

It is further preferred that the measuring zone of the autofocus system and also the metering point of the spot metering system be automatically reset to the centre of the image whenever the camera is switched on or whenever the track ball 16 or the joystick is released.

A modified embodiment provides further for the size of the autofocus measuring field to be variable.

For the mechanical system for displacing the autofocus measuring field (not shown in the drawing), systems used hitherto can be applied without major modifications having to be made to their operation. The measuring unit is exactly positioned to where the point of focus and also the correct exposure are desired simply by means of vertical and transverse movements or even by straightforward pivoting about its own axis. Thus the entire compact block of the autofocus and spot metering systems is moved mechanically within the frame and then locked on the position which is to be measured. Movement occurs mechanically by means of knurled wheels or similar with a suitable transport system or electromechanically with the aid of rocker switches and electric motors. The mechanical transport system is connected to an optically striking and as multi-coloured as possible indicator dot on the focusing screen of reflex cameras or in the viewfinder of viewfinder cameras which indicates absolutely clearly the location of the autofocus measuring field within the frame. By optically reducing the entire frame directly before the measuring cells it is possible greatly to reduce the above-described movements of the measuring block and to perform them within a very restricted area.

All the features and advantages of the invention arising from the description, claims and drawings, including design details and spatial configurations can be characteristic of the invention both in themselves and in any desired combination.

I claim:

1. An autofocus system for cameras comprising:
   a separator for dividing light of an image of an object being viewed in an autofocus measuring field viewed through a camera lens of the camera into two beams;
   measuring means for determining a distance from an object being viewed to a film plane in the camera based on the two beams from said separator;
   focusing means for focusing the camera lens on the object being viewed;
   displacement control means for controlling the displacement of the autofocus measuring field so as to be able to focus on a desired location within a frame showing the image of the object being viewed, said displacement control means including electronic means for electronically controlling the displaceability of the autofocus measuring field by electronically duplicating the image in the frame, and incorporating a microprocessor for measuring a specifiable partial area within the electronically duplicated image, wherein said electronic means further incorporates a CCD double chip for transferring thereon the image in the frame, and the microprocessor synchronously actuates a partial area on the CCD double chips corresponding to the partial area within the electronically duplicated image; and
   focus control means connected to said measuring means for controlling said focus means in accordance with the distance to the object being viewed.

2. An autofocus system as claimed in claim 1, wherein said electronic means further incorporates a luminous intensity CCD chip for transferring thereon the image in the frame such that a partial area of the luminous intensity CCD chip corresponding to the partial area within the electronically duplicated image can be specified by the microprocessor.

3. An autofocus system as claimed in claim 2, wherein actuation of the partial area of the luminous intensity CCD chip is synchronous with the actuation of corresponding partial areas of the CCD double chip.

4. An autofocus system as claimed in claim 3, wherein a plurality of adjacent partial areas in the luminous intensity CCD chip and the CCD double chip can be actuated by the microprocessor to alter the size and form of the autofocus measuring field and the metering point of the spot meter.

5. An autofocus system as claimed in claims 4, further comprising:
   image reducing means for optically reducing the image of the object being viewed that is focused on the frame before said measuring means determines the distance to the object being viewed.

6. An autofocus system as claimed in claim 5, wherein said image reducing means includes a three-element lens system in which first and second elements are directed to said separator and a third element is directed to the luminous intensity CCD chip.

7. An autofocus system as claimed in claim 6, further comprising:
   a light-emitting diode matrix for indicating the partial areas of the luminous intensity CCD chip and of the CCD double chip that are actuated.

8. An autofocus system as claimed in claim 6, wherein said electronic means includes a zone selector for operating the microprocessor.

9. An autofocus system as claimed in claim 8, wherein the zone selector is a track ball.

10. An autofocus system as claimed in claims 8, wherein a shutter release of the camera is operatively connected with the zone selector such that focusing, light metering and release of the shutter are controllable by a single trigger action.

11. An autofocus system as claimed in claim 8, wherein said displacement control means controls the autofocus measuring field together with the metering point of the spot meter such that the autofocus measuring field together with the metering point of the spot meter are reset to an image center of the image in the frame when at least one of the camera is switched on and when the zone selector is released.

12. An autofocus system as claimed in claim 6, further comprising:
   a semi-transparent hinged mirror silvered on front and back faces;
   a fully reflecting mirror said semi-transparent hinged mirror located in front of said fully reflecting mirror in a first path of the light of the image so as to allow a first part of the light to pass to said fully reflecting mirror and be reflected onto the back face of said semi-transparent hinged mirror;
   a focusing screen located so as to receive a second part of the light reflected from the front face of said semi-transparent mirror; and
   a third mirror located whereby the second part of the light reflected from the back face of said semi-transparent hinged mirror is directed to reflect from said third mirror onto the three-element lens system.

13. An autofocus system as claimed in claim 12, wherein said image reducing means further includes a reduction lens located in front of said third mirror.

* * * * *